Feb. 14, 1928.
C. O. PARKHURST
1,659,497
APPARATUS FOR REPAIRING TIRES
Filed Oct. 11, 1926  2 Sheets-Sheet 1
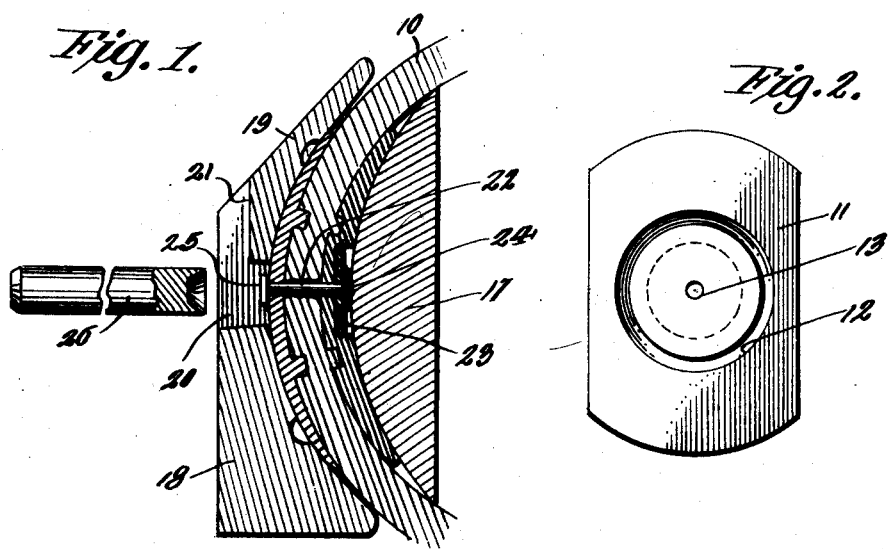
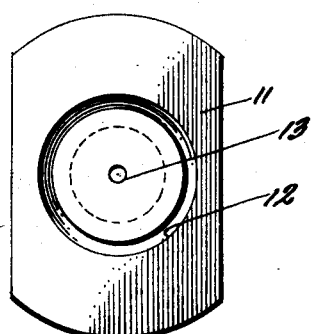
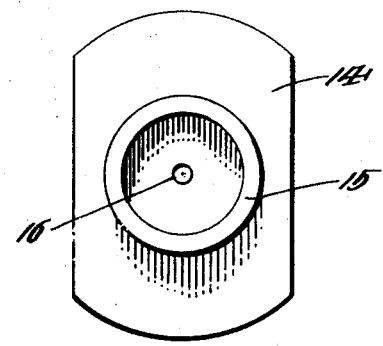
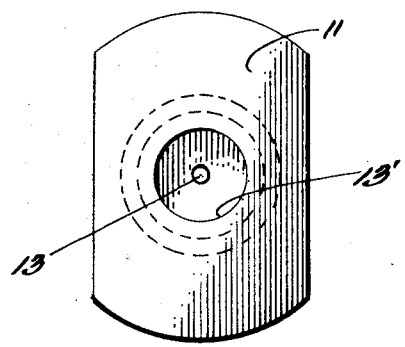
WITNESSES
Inventor
CHARLES O. PARKHURST
By Richard B. Owen
Attorney Feb. 14, 1928.
C. O. PARKHURST
1,659,497
APPARATUS FOR REPAIRING TIRES
Filed Oct. 11, 1926     2 Sheets-Sheet 2
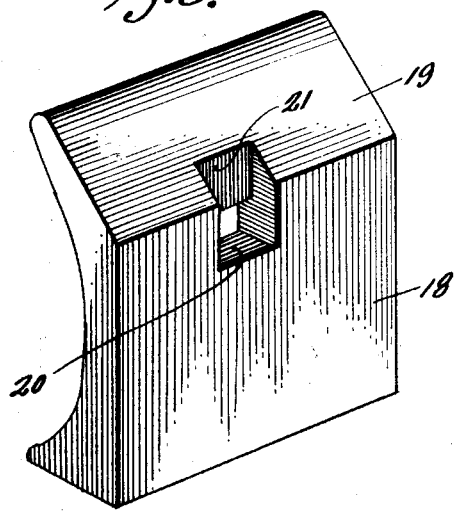
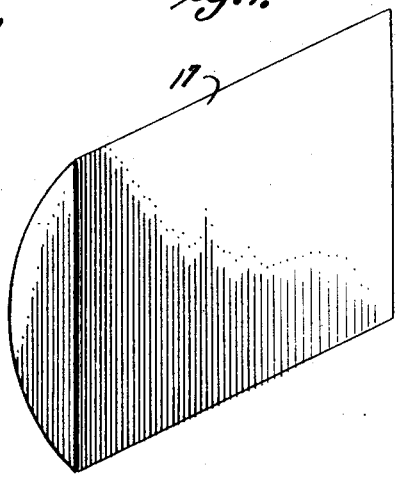
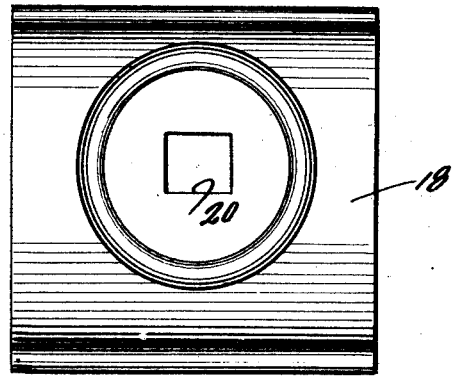
WITNESSES
Inventor
CHARLES O. PARKHURST
By Richard B. Owen, Attorney Patented Feb. 14, 1928.

1,659,497

UNITED STATES PATENT OFFICE.

CHARLES O. PARKHURST, OF DELEVAN, ILLINOIS.

APPARATUS FOR REPAIRING TIRES.

Application filed October 11, 1926. Serial No. 140,991.

The present invention relates to an improved method and apparatus for repairing vehicle tires, and has for its primary object to provide an apparatus for durably sealing a tire damaged by a blow-out or puncture.

A further object of the invention is the provision of an apparatus of the above character which can be readily applied to a tire casing and prolong the usefulness of the tire.

A still further object of the invention is the provision of means whereby damaged tire casings, which might otherwise be discarded, may be efficiently repaired for emergency use.

Another object of the invention is the provision of tire repair means of the above character which will be durable and efficient and which can be manufactured at a relatively low cost.

Other objects and advantages of the invention will become apparent as the description progresses.

In the accompanying drawings forming a part of this specification and in which like reference characters are employed to designate corresponding parts throughout the same, Figure 1 is a transverse sectional view through a fragmentary portion of the tire casing and my improved repair apparatus mounted in association therewith, Figure 2 is an outer side view of one of the patch strips, Figure 3 is an inside view of a complementary patch strip, Figure 4 is an inner side view of the inner patch strip, Figure 5 is a perspective view of the outer retaining plate, Figure 6 is an inside view of the said outer retaining plate, and Figure 7 is a perspective view of the inner retaining plate.

Referring to the drawings, wherein for the purpose of illustration is shown the preferred embodiment of my invention, the numeral 10 generally designates a fragmentary portion of a tire casing having an opening therethrough caused by a blow-out or in any similar manner. My invention essentially comprises a blow-out seal comprising an inner patch strip 11 formed at its outer surface with a groove 12 and at its inner central portion with a circular recess 13'. A transverse opening 13 is formed through the center of the patch strip 11 as is clearly shown in Figures 2 and 4.

An outer patch strip 14 of elongated form is adapted to be tightly positioned against the outer side of the tire casing 10, this strip being formed with a circular ring 15 adapted to be positioned in opposed relation to the groove 12 formed in the inner patch strip 11 and formed with a transverse opening 16. The patch strips 11 and 14 are preferably formed of durable metal which can be bent under suitable pressure and in a forming clamp to conform to the natural curvature of the tire casing.

In carrying out my invention, I provide an inner mould plate 17 of rectangular formation having an inner flat side and an outer convex side so as to be segment shaped in cross-section. Co-acting with the inner mould plate 17 is an outer plate 18 of generally rectangular formation having its inner side formed in concave formation conforming to the outer contour of the tire casing and having an angularly projecting side plate 19. This outer mould plate 18 is formed with a transverse slot 20 communicating with a transverse groove 21.

In applying my improved tire seal upon a tire casing, the inner and outer patch strips 11 and 14 are arranged in opposed positions on the inner and outer sides of the casing. A rivet 22 is extended through the openings in the casing 10 and central openings in the patch strips. The inner end of the rivet is extended through a circular washer 23 fitted in the circular recess 13' in the inner patch strip and formed with a head 24. The inner and outer mould plates 17 and 18 are then arranged in operative positions against the patch strip and clamped under high pressure, so as to bend the patch strips to conform to the curvature of the casing, as indicated in Figure 1. The outer projecting end of the rivet 22 is then riveted to form a head 25 by means of a riveting hammer punch 26. Thus, the patch strips are tightly fastened upon the casing and secured against displacement by means of the circular ring 15 formed on the outer patch strip and the circular groove 12 formed on the inner strip. When the patch strips have been bent to the proper curvature the outer and inner mould plates are removed and the tire casing will be in condition for further use.

From the foregoing description and the drawings, it will be readily noted that the present apparatus provides means for durably sealing blow-outs and various other tire-casing injuries so as to prolong the life of the casing. An essential feature of the present construction resides in the durability of the seal and the formation of the patch strip which obviates any inherent injury to the casing, and provides a water tight patch.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. A method of sealing tire casings consisting of placing a pair of complementary patch strips of metal construction against the inner and outer sides of the casing, extending a rivet through the casing and strips to fasten the same together and compressing and bending the patch strips between a pair of inner and outer mold members to cause the strips to conform to the curvature of the casing.

2. A method of sealing damaged tire casings consisting of placing an inner patch strip on the inner side of the casing, placing a second patch strip on the outer side of the casing in opposed relation to the inner patch strip, projecting a rivet through the casing and openings in the patch strips and connecting the same, and compressing and bending the patch strips to conform to the curvature of the casing by means of properly formed inner and outer mould plates pressed together under high pressure.

3. In a tire casing repair means employing a pair of deformable plates designed to be secured together at opposite sides of a casing, a forming mould comprising an inner mould body having a convex face designed to conform to the inner curvature of a tire casing and an outer mould body having a concave face to conform to the outer surface of the tire, said outer mould body having a passageway formed transversely therethrough designed to permit the insertion of a punch hammer for action upon a securing member arranged between the mould plates and securing the first mentioned plates in position, said mould plates forming the patch plate to conform to the curvature of the casing, when fastened together.

In testimony whereof I affix my signature.

CHARLES O. PARKHURST.